(12) United States Patent
Schutte

(10) Patent No.: US 9,644,767 B2
(45) Date of Patent: May 9, 2017

(54) PIPE SUPPORT

(71) Applicant: Martin Schutte, Lake Charles, LA (US)

(72) Inventor: Martin Schutte, Lake Charles, LA (US)

( * ) Notice: Subject to any disclaimer, the term of this patent is extended or adjusted under 35 U.S.C. 154(b) by 0 days.

(21) Appl. No.: 14/807,251

(22) Filed: Jul. 23, 2015

(65) Prior Publication Data

US 2016/0025245 A1 Jan. 28, 2016

Related U.S. Application Data

(60) Provisional application No. 62/029,312, filed on Jul. 25, 2014.

(51) Int. Cl.
| | |
|---|---|
| *F16L 3/20* | (2006.01) |
| *F16L 58/00* | (2006.01) |
| *F16L 1/00* | (2006.01) |
| *F16L 3/26* | (2006.01) |
| *F16L 3/02* | (2006.01) |
| *F16L 1/06* | (2006.01) |

(52) U.S. Cl.
CPC ....... *F16L 3/26* (2013.01); *F16L 1/06* (2013.01); *F16L 3/02* (2013.01); *F16L 58/00* (2013.01)

(58) Field of Classification Search
CPC ......... F16L 3/137; F16L 3/1207; F16L 3/127; F16L 3/2235; F16L 59/135; F16L 58/10; F16L 3/26; F16L 3/12; F16L 3/223; F16L 1/06; F16L 58/00
USPC ..... 248/62, 65, 68.1, 53, 74.1, 519, 678, 49, 248/346.01
See application file for complete search history.

(56) References Cited

U.S. PATENT DOCUMENTS

| | | | |
|---|---|---|---|
| 3,963,205 A | 6/1976 | Hageman | |
| 4,744,535 A * | 5/1988 | Patenaude | F16L 3/1207 248/62 |
| 4,826,113 A | 5/1989 | Winters | |
| 4,852,831 A * | 8/1989 | Sandstrom | F16L 59/135 138/149 |
| 4,899,963 A * | 2/1990 | Murphy | F16L 3/137 24/16 R |
| 5,611,514 A | 3/1997 | Oliver et al. | |
| 6,250,591 B1 * | 6/2001 | Cunningham | F16L 3/2235 248/65 |
| 7,281,689 B1 | 10/2007 | Johnston | |
| 7,328,724 B2 * | 2/2008 | Britton | F16L 58/10 138/106 |
| 7,854,341 B2 * | 12/2010 | Martin | B44D 3/126 220/23.86 |
| 2006/0131465 A1 | 6/2006 | Lynch, Jr. et al. | |

(Continued)

FOREIGN PATENT DOCUMENTS

CA    2107707    10/1993

*Primary Examiner* — Tan Le

(57) ABSTRACT

A pipe support structure comprised of a series of blocks mounted on a base to create opposing ridges arrayed on opposite sides of a central drainage channel. The ridges have a rounded curved outer surface and create intervening valleys that are sloped to direct fluid flow into the central drainage channel. The ridges are arranged and oriented so that the curved outer surface of the ridges support the pipe on its peripheral underside above with the drainage channel and create a space between the bottom of the pipe and the base. The blocks may be angled to further facilitate desired drainage into the drainage channel.

12 Claims, 7 Drawing Sheets

(56) References Cited

U.S. PATENT DOCUMENTS

| | | | |
|---|---|---|---|
| 2009/0106892 A1* | 4/2009 | Hickey | A47K 1/06 4/631 |
| 2009/0277913 A1* | 11/2009 | Bergman | B44D 3/126 220/570 |
| 2010/0155545 A1* | 6/2010 | Birli | F16L 3/127 248/70 |
| 2016/0025245 A1* | 1/2016 | Schutte | F16L 3/26 248/49 |

* cited by examiner

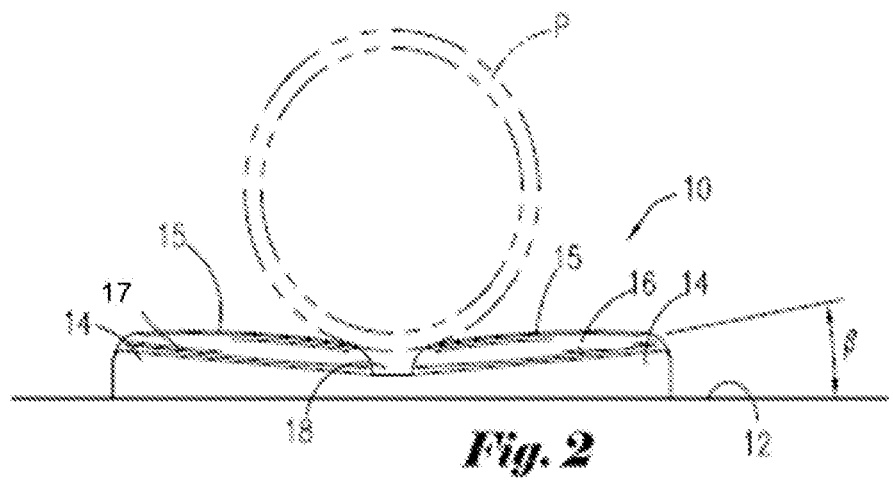
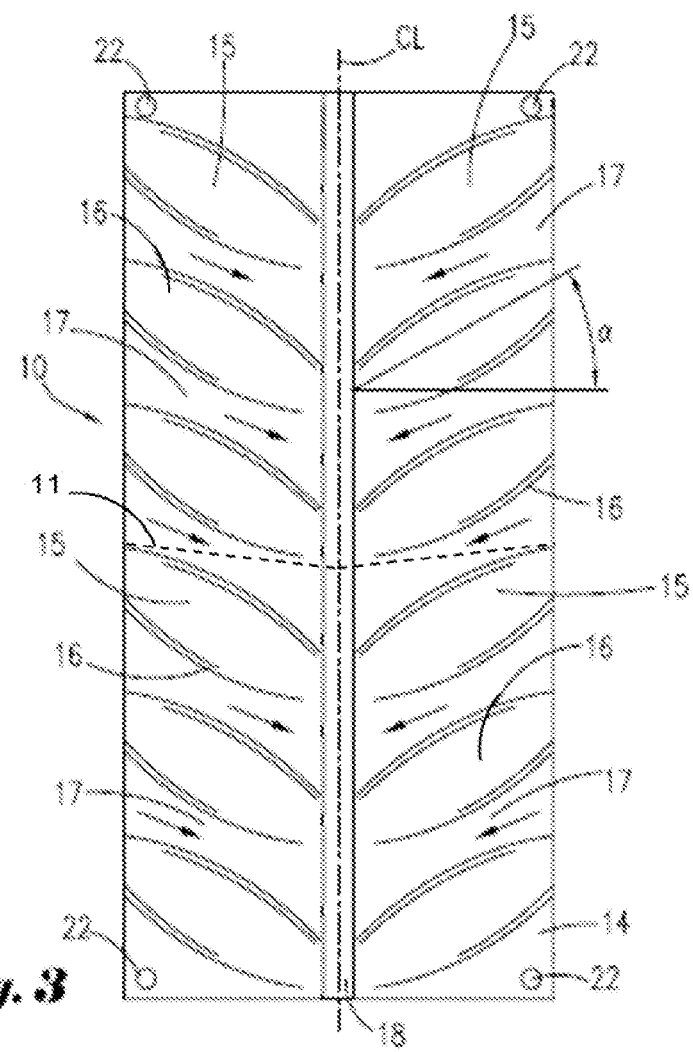

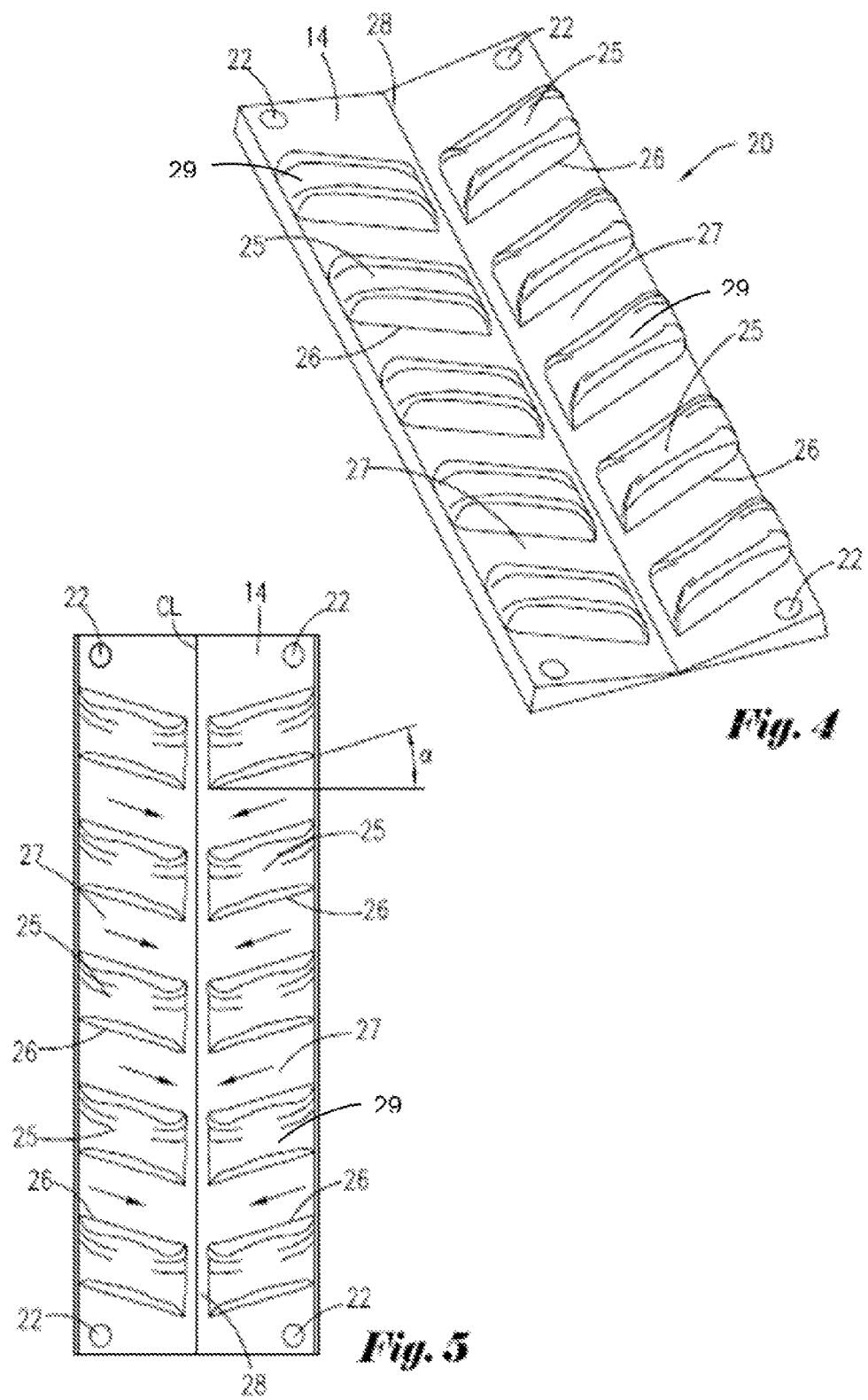

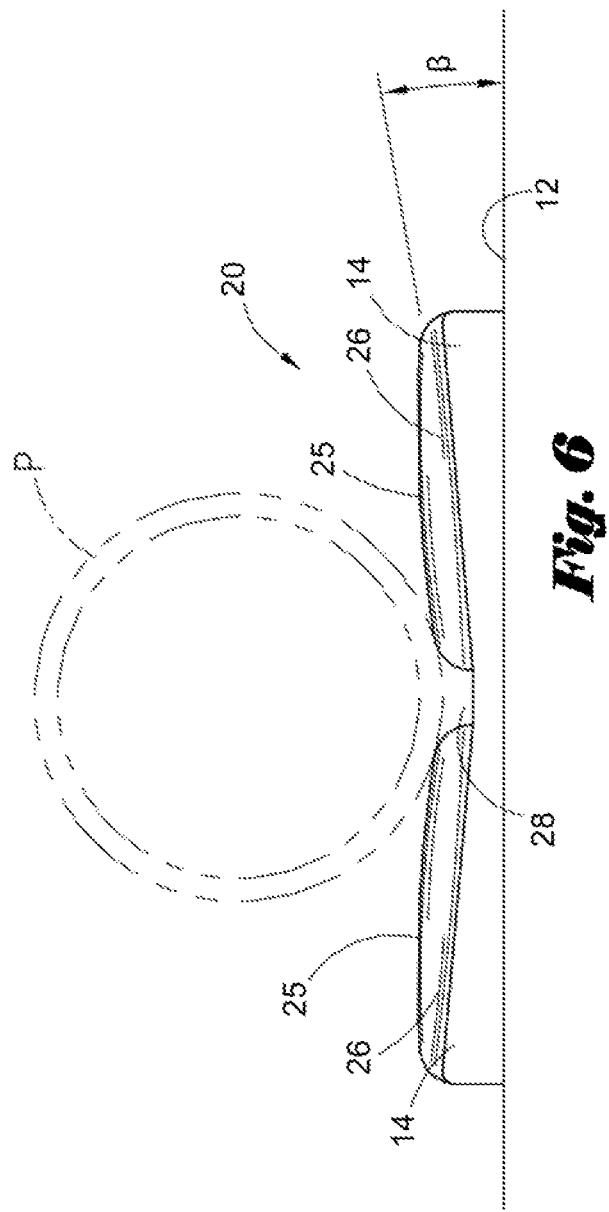

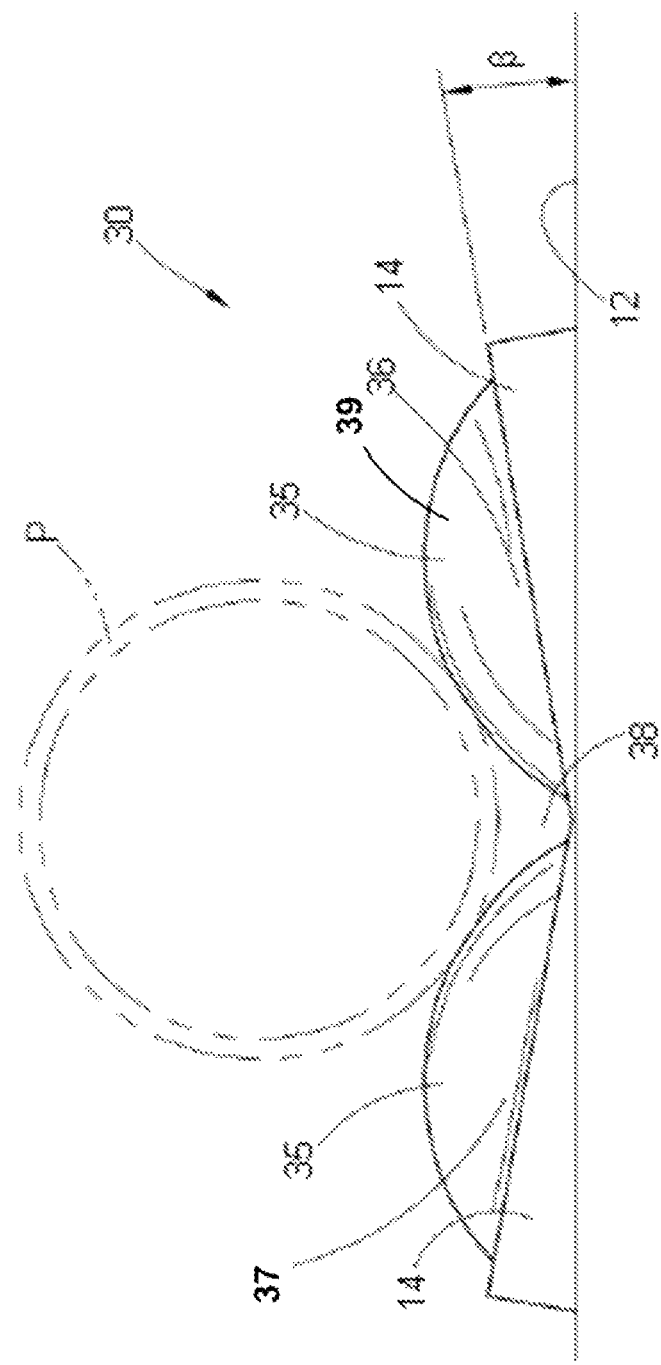

PIPE SUPPORT

PRIORITY

This application claims priority to U.S. provisional application Ser. No. 62/029,312 filed Jul. 25, 2014 entitled "Pipe Support", the entire content of which is hereby incorporated by reference.

FIELD OF INVENTION

The subject invention relates generally to pipe and tubing support structures. More particularly it relates to a pipe and tubing support structure having a bearing surface comprised of a plurality of support ridges creating intervening valleys that provide drainage away from a supported pipe to reduce wear and corrosion on the pipe, support, bearing surfaces.

BACKGROUND OF INVENTION

Transport of substances by pipeline and instrumentation tubing (hereinafter "pipe", "piping", and "pipe system") involves long interconnected lengths of pipe stretching over large distances. In many cases, the interconnected lengths of pipe are run in open air and marine environments as well as in specialized processing facilities.

If left unsupported or without a structure upon which to run, interconnected lengths of pipe may sag and bend under its own weight to cause stripping of the internal threads. Such problems are easily solved by the placement of pipe supports beneath long running lengths of pipe. In order to house the rounded surfaces of the tubular pipe such pipe supports are generally fashioned as saddles tapered inward as to allow the pipe surface to rest in a manner to resist radial shifting and slipping free form the support structure. Pipe supports being of such cupped and bowl like contour create a prime location for collection of rain, dirt, and particulate matter which can settle inside the pipe support between the support and the pipe casing.

Complicating the situation, the settings in which pipe lengths are run and supported, mainly marine environments and industrial facilities, expose the pipe and pipe supports to an atmosphere of abrasive wind and rain containing chemicals, salt, course particulate, and other grit and contaminants which, if left in contact between a pipe and pipe support, can damage and corrode the piping systems.

Pipe surfaces composed of stainless and carbon steel if left in contact with pooled salt water will rust as the fluid acts as an electrolyte to sap the electrons from the surface material, thus degrading the pipe casing. Fluid and other contaminants pooling at the base or junction between the pipe and pipe supporting structure maintains and enhances the corrosion and piping damage. Additionally, expansion and contraction of the pipe system piping due to internal pressures and temperatures, in combination with the environmental conditions causing shifting of the pipe upon the pipe support, further exacerbates this corrosion and damage.

If such corrosive contaminants are left in prolonged contact with the pipe and pipe support, the corrosive and abrasive substances will eat away the protective linings of the pipe and pipe support. Degradation of pipe casings and pipe support walls increases the occurrence of containment failure considerably in a pipe. A pipe having inadequate casing strength will likely breach under the substantial internal pipe pressure ordinarily maintained during piping operations wherein the oftentimes hazardous materials contained within the pipe may be spilled forth.

Due to such risk of corrosive and abrasive damage to pipe and pipe supports, lengths of pipe and pipe supports must be examined regularly to assess casing integrity to predict and prevent the occurrence of pipe and support failure. Millions of dollars are spent each year to inspect, repair, and replace damaged piping and pipe support systems as a result of corrosion due to pooling fluid.

As should be readily apparent, there is a strong need for improvements in pipe support structures to more effectively prevent pooling in the pipe support which can cause corrosion and damage to pipe and piping systems.

SUMMARY OF INVENTION

The present invention provides an apparatus for supporting the piping of a piping system wherein contaminants are prevented from pooling in contact with the pipe supported on the pipe support. The apparatus is a pipe support structure having a base plate with a plurality of opposing support ridges arrayed along the centerline of the base plate. The ridges are sized, oriented, and spaced apart to create an intervening valley between each ridge. These valleys are oriented to direct flow of fluid such as rainwater and any contaminants into a drainage channel positioned along the centerline of the pipe support base plate. The combination of valleys and the drainage channel provides a path to divert fluid and contaminants away from the pipe surface.

The ridges are arranged and oriented so the pipe is not supported from directly underneath. Instead, the pipe is supported on its peripheral underside edges to allow the pipe to sit upon the pipe support ridges above the flow of fluid and contaminants passing along the drainage channel. Supporting the pipe on the ridges above the drainage channel creates a space between the supported pipe and the flow of fluid and contaminants that allows for the removal of fluid and contaminants from the pipe support without facilitating contact between the flow of fluid and the pipe being supported. Further, supporting the pipe on the ridges creates a raised space between the pipe and the valleys and drainage channel preventing the pipe from resting in a pool of fluid. Such a pipe support assembly will allow for drainage of fluid and contaminants around the pipe support, eliminate the problems of corrosion associated with fluid pooling around the supported pipe, and allow a space between the pipe support and the supported pipe to encourage evaporation of moisture around the supported pipe. The array of ridges provided in pipe support structure allows a length of pipe to be supported at a variety of sloping and horizontal orientations while maintaining the flow of fluid and contaminants away from the surface of the supported pipe.

The ridges and intervening valleys of the pipe support may be sized, oriented, and arranged to support virtually any size of pipe. The ridges and intervening valleys of the pipe support may also be sized, oriented, and arranged so that a single pipe support structure is configured to support a desired range of pipe sizes.

The pipe support structure may be constructed from a variety suitable materials or combination of materials. The pipe support structure may be molded from non-corrosive thermoplastic polymer materials and composites. Thermoplastic polymer materials and composites suitable for molding the pipe support structure include polyethylene (PE) and polyethylene composites including high-density polyethylene (HDPE), ultra-high molecular weight PE (UHMWPE), and medium-density PE (MDPE), or a combination of such materials, and including those materials with reinforcing fibers.

The pipe support structure may also be cast or machined from metals or metal alloys such as stainless steel, aluminum, or aluminum alloys. Supports made of metals or metal alloys may be provided with a non-corrosive coating such as a polymer coating to further impede corrosion of the support during use. In harsh environments non-corrosive metals or metal alloys may be more suitable due to their advantages of structural strength and non-corrosive characteristics.

When molded or cast, the pipe support structure may be formed in convenient lengths or strips that may be cut in the field in segments of a desired length to match a particular support situation. This will allow a user to customize a pipe support in the field as desired. A single segment of the pipe support structure may then be fitted into place to support the pipe or multiple segments of the pipe support structure may be used depending upon the pipe to be supported and the characteristics of the underlying support where the pipe support structure is to be mounted.

As the pipe support structure is generally not sensitive to temperature and atmospheric changes, it may be easily installed without concern for the ambient environmental conditions. Installation may be accomplished simply by lifting the pipe to be supported to a desired position, removing any prior support if present, cleaning the pipe and underlying support area of adherent materials, fluid, or corrosives which may hinder fluid flow or corrosion resistance, replacing any damaged corrosive protection coatings on the pipe, placing the new pipe support structure under the pipe, and placing the pipe on the new pipe support structure. No welding or other costly installation techniques are required.

BRIEF DESCRIPTION OF TOE DRAWINGS

FIG. 2 is an end view of the pipe support structure shown in FIG. 1.

FIG. 3 is a top view of the pipe support structure shown in FIG. 1 including a general representation of flow within the valleys.

FIG. 4 is an isometric view of an alternate embodiment of the pipe support structure of applicant's invention.

FIG. 5 is a top view of the alternate embodiment of the pipe support structure of applicant's invention shown in FIG. 4 including a general representation of flow within the valleys.

FIG. 6 is an end view of the alternate embodiment of the pipe support structure of applicant's invention shown in FIG. 4 mounted for supporting a pipe.

FIG. 9 is an end view of the alternate embodiment of the pipe support structure of applicant's invention shown in FIG. 7 mounted for supporting a pipe.

DESCRIPTION OF EMBODIMENT

Figure 1:
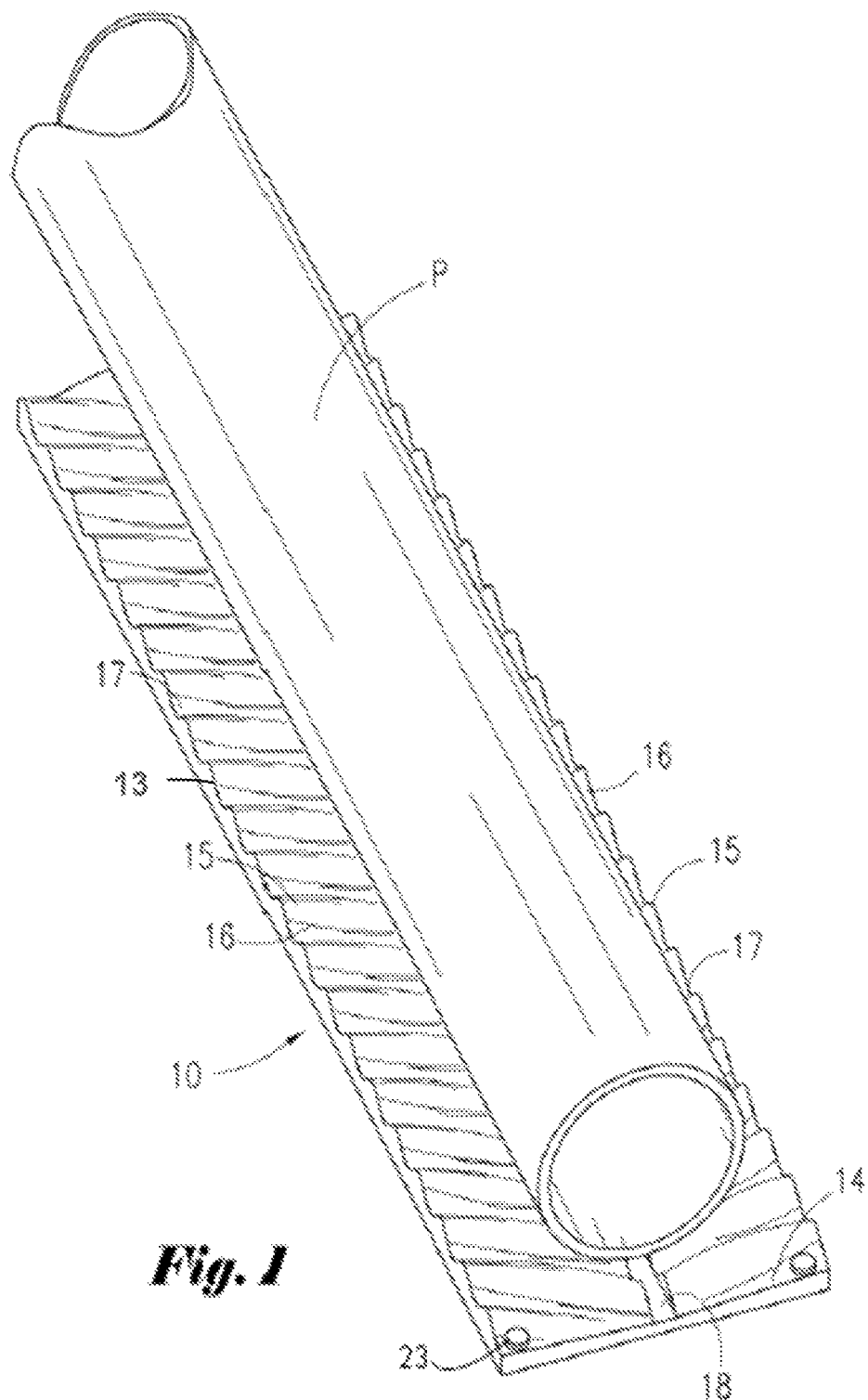
FIG. 1 is an isometric view of the pipe support structure of applicant's invention supporting a length of pipe.

FIGS. 1-3 show the pipe support structure (10) of applicant's invention. The pipe support structure (10) is comprised of a longitudinally extending base (14) having a longitudinal centerline (CL) on which is mounted a plurality of support blocks (15). The support blocks (15) are arranged with upper arching curved surfaces to create a series of opposing ridges (16) arrayed on opposite sides of the longitudinal centerline (CL) of the base (14). The series of ridges (14) are sized, oriented, and spaced apart to create intervening valleys (17) between each ridge (16).

As best seen in FIG. 1, blocks (15) are arranged to create interconnected ridges (16) and intervening valleys (17 forming a surface profile (13) in the shape of a wave such as a sinusoidal wave. A waved profile (13) will provide a smooth transition between each ridge (16) and valley (17) to promote the flow of fluid into channel (18). As best seen in FIG. 2, the pipe support structure (10) is shown mounted on a support surface (12) of a pipe system. The blocks (15) of pipe support structure (10) are arranged and oriented on base (14) so that the ridges (16) abut and support a pipe (P) longitudinally on its peripheral underside and not from directly underneath pipe (P).

The wave shaped profile (13) of the ridges (16) and valleys (17) of blocks (15) combined with the tapered downward slope of base (14) will enhance the flow of fluid into channel (18) and away from pipe (P) and provide a means for removing fluid away from the surface of pipe (P). This will eliminate the need for frequent inspection and rehabilitation of the pipe support structure and ultimately reduce the cost of inspection, maintenance, and repair. As shown in FIG. 2, the base (14) is sloped at a desired slope angle ($\beta$) so that fluid such as rainwater is directed from the valleys (17) to flow to the channel (18) for drainage. A base (14) having slope angle ($\beta$) in the range of 5 to 20 degrees is thought to be sufficient for diverting fluid to the channel (18). An angle ($\beta$) outside that range, i.e., less than 5 degrees or greater than 20 degrees, may be sufficient to achieve desired drainage depending upon the environmental conditions where the pipe support structure (10) will be utilized.

The curved surfaces and ridges (16) of the blocks (15) direct fluid down the curved surface into intervening valleys (17) and away from the pipe (P) preventing the accumulation of fluid in contact with pipe (P). The base (14) is tapered downward toward centerline (CL) to create a draining flow of fluid (indicated by arrows) from the valleys (17) into a drainage channel (18) on base (14). The tapered base and drainage channel create fluid flow paths to divert and drain fluid away from the surface of the supported pipe (P).

The base (14) may be further provided with bolt holes (22) to facilitate securing of the pipe support structure (10) to the main support surface (12) of a pipe system with anchor bolts as a means (23) for affixing the pipe support structure (10) to the main support structures (12). The affixing means (23) may be any pin, screw, bolt, rivet, or other fastening means conventional in the art. Affixing means (23) may also be an adhesive such as glue, epoxy, or grout that provides a bond to affix the pipe support structure (10) to the main support structures (12).

As shown in FIGS. 1 and 2, the ridges (16) raise the pipe above base (14) and channel (18) to prevent the pipe (P) from resting in a pool of fluid. This will allow drainage and prevent moisture from being collected and trapped beneath pipe (P) which would otherwise cause wear and corrosion of pipe (P). Fluid runs onto and down the sides of pipe (P), over and down the curved ridge surfaces of the support block (15) into valleys (17) between the ridges (16), and down the sloped base (14) into channel (18) at the bottom of the base (14), wherein it runs to the end of channel (18) and falls off onto the support surface (12) or onto grade.

FIG. 3 is a top view of the pipe support structure (10) showing orientation of the blocks (15) and support ridges

(16) along the length of the base (14). The ridges (16) may be arrange at any desired angle (α) with respect to the horizontal centerline (CL) of the base (14) in order to create a suitable valley (17) with sufficient space for drainage and provide adequate support on the peripheral underside of the pipe (P). An angle (α) in the range of 25° to 35° such as 30° is thought to be sufficient though angles of lesser or greater degrees may also be implemented to achieve desired drainage.

The base (14) may be provided with predetermined break points (11) to allow the pipe support structure (10) to be adjusted or altered in the field to accommodate a particular pipe support situation. The predetermined break points (11) may be a scored or notched area on the surface of the base to allow the pipe support structure (10) to be readily broken down or cut into segments if the need for a shorter pipe support structure is required.

FIGS. 4-6 show pipe support structure (20) as an alternate embodiment of pipe support structure (10). Pipe support structure (20) is comprised of a base (14) upon which is mounted a plurality of substantially rectangular shaped support blocks (25) having an arched or rounded top and side surface (29). The support block (25) with arching curved surfaces (29) are arranged to create a series of opposing ridges (26) arrayed on opposite sides of the centerline (CL) of the base (14). The series of ridges (26) are sized, oriented, and spaced apart to flat intervening valleys (27) between each ridge (26). Blocks (25) having such arched or curved surfaces (29) will cause fluid to be directed down the curved surface (29) into intervening valleys (27) and away from the pipe (P), thus preventing the accumulation of fluid in contact with pipe (P). The base (14) is tapered downward towards centerline (CL) to create a draining flow of fluid (indicated by arrows) from the valleys (27) into a drainage channel (28) on base (14) to create a path to divert and drain fluid away from the surface of the pipe (P).

The spaced orientation of rounded blocks (25) create ridges (26) and flat intervening valleys (27) upon base (14). The combination of the rounded surfaces of ridges (26) with the flat valleys (27) promotes fluid and contaminants to travel down the tapered surface of base (14) a and into the intersecting surfaces creating drainage channel (28).

FIG. 6, similar to that of FIG. 2, shows the pipe support structure (20) mounted on a support surface (12) of a pipe system. The blocks (25) are arranged and oriented longitudinally on base (14) so that the curved ridges (26) support a longitudinally oriented pipe (P) on its peripheral underside and not from directly underneath pipe (P). The base (14) is sloped at a desired slope angle (β) so that fluid from the valleys (27) is directed to flow to the channel (28) for drainage. A slope angle (β) in the range of 5 to 20 degrees is envisioned to be sufficient though angles of lesser or greater degrees may also be implemented to achieve desired drainage. The base (14) may be further provided with bolt holes (22) to facilitate securing of the pipe support structure (20) to the main support surface (12) of a pipe system through use of affixing means (23). Affixing means (23) includes pins, screws, bolts, rivets, and adhesives and bonding agents such as glue, epoxy, or grout.

The curved surface (29) of ridges (26) raise the pipe (P) above base (14) and channel (28) to prevent the pipe (P) from resting in a pool of fluid. This allows drainage and prevention of moisture from trapping beneath pipe (P) which would otherwise cause wear and corrosion of pipe (P). Fluid runs onto and down the sides of pipe (P), over and down the rounded curved surfaces of the support blocks (25) into valleys (27) between the ridges (26), and down the sloped base (14) into channel (28) at the bottom of the base (14), and then to the end of channel (28) to fall onto the support surface (12).

FIG. 5 is a top view of pipe support structure (20) showing orientation of the support ridges (26). The ridges (26) may be arrange at any desired angle (α) with respect to the horizontal centerline (CL) of the base (14) in order to create a suitable valley (27) with sufficient space for drainage and provide adequate support on the peripheral underside of the pipe (P). An angle (α) in the range of 25 to 35° such as 30° is thought to be sufficient though angles of lesser or greater degrees may also be implemented to achieve desired drainage.

Figure 7:
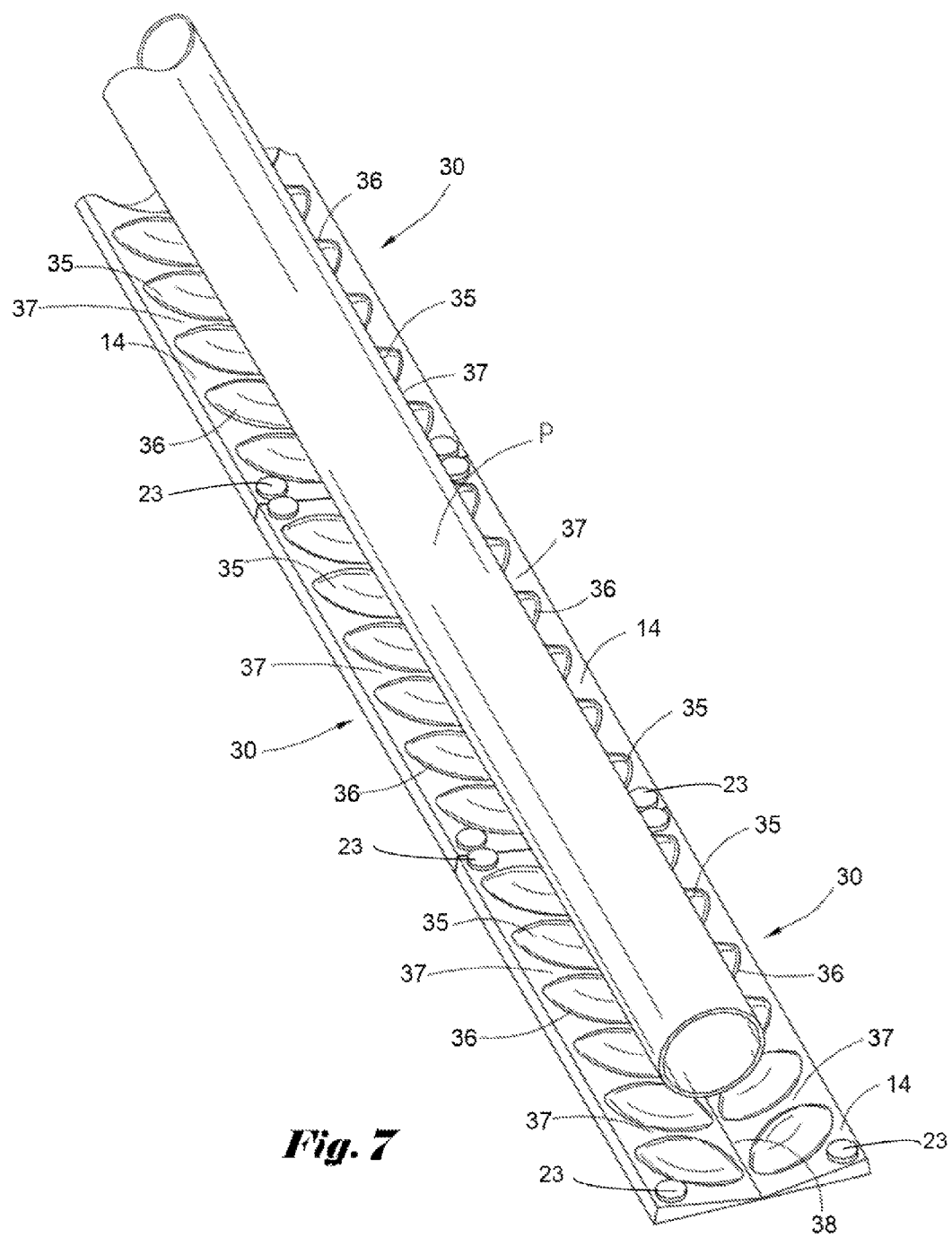
FIG. 7 is an isometric view of another alternate embodiment of the pipe support structure of applicant's invention supporting a length of pipe.
Figure 8:
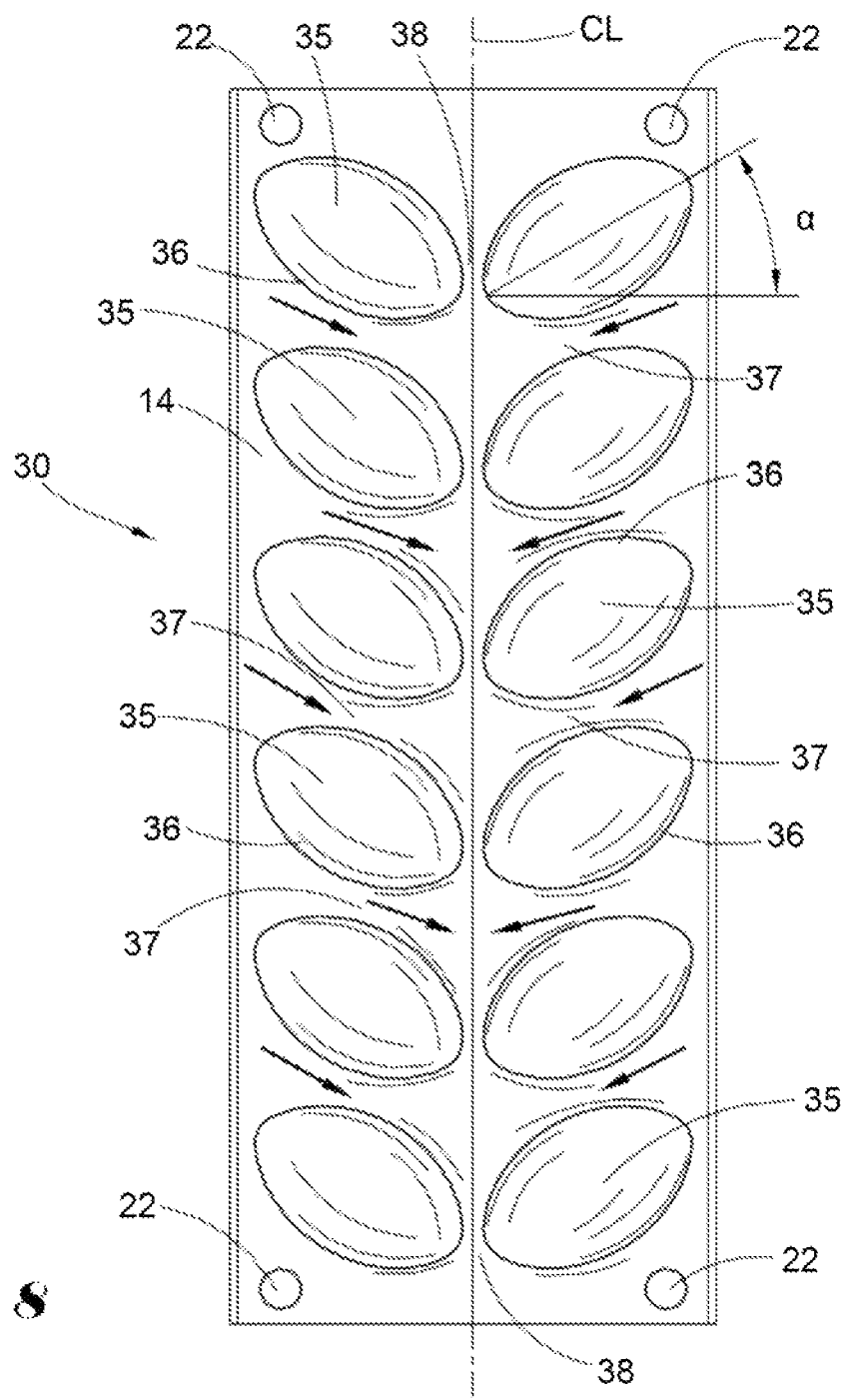
FIG. 8 is a top view of the alternate embodiment of the pipe support structure of applicant's invention shown in FIG. 7 including a general representation of flow within the valleys.

FIGS. 7-9 show pipe support structure (30) as an alternate embodiment of pipe support structure (10). Pipe support structure (30) is comprised of a base (14) on which is mounted a plurality of rounded support blocks (35) having a substantially egg or ovate shape. The support blocks (35) are arranged with arching curved surfaces (39) to create a series of opposing ridges (36) arrayed on opposite sides of the centerline (CL) of the base (14). The series of ridges (36) are sized, oriented, and spaced apart to flat intervening valleys (37) between each ridge (36). Blocks (35) having such curved surfaces causes fluid to be directed down the curved surface into intervening valleys (37) and away from the pipe (P), thus preventing the accumulation of fluid in contact with pipe (P). The base (14) is tapered downward towards centerline (CL) to create a draining flow of fluid (indicated by arrows) from the valleys (37) into a drainage channel (38) on base (14) to create a path to divert and drain fluid away from the surface of the pipe (P).

As shown in FIG. 7, the spaced orientation of blocks (35) comprising ridges (36) creates flat intervening valleys (37) upon base (14). The combination of the rounded surfaces of ridges (36) with the flat valleys (37) promotes fluid and contaminants to travel down the tapered surface of base (14) and into the intersecting surfaces creating drainage channel (38).

FIG. 9 shows the pipe support structure (30) mounted on a support surface (12) of a pipe system in a manner to that shown for pipe support structure (10) and pipe support structure (20). The blocks (35) are arranged and oriented on base (14) so that the curved surfaces (39) of ridges (36) support pipe (P) on its peripheral underside and not from directly underneath pipe (P). The base (14) is sloped at a desired slope (β) so that fluid from the valleys (37) is directed to flow to the channel (38) for drainage. A slope angle (β) in the range of 5 to 20 degrees is envisioned to be sufficient though angles of lesser or greater degrees may also be implemented to achieve desired drainage. The base (14) may be further provided with bolt holes (22) to facilitate securing of the pipe support structure (20) to the main support surface (12) of a pipe system through use of affixing means (23). Affixing means (23) includes pins, screws, bolts, rivets, and adhesives and bonding agents such as glue, epoxy, or grout.

The ridges (36) raise the pipe (P) above base (14) and channel (38) to prevent the pipe (P) from resting in a pool of fluid. This allows drainage and prevention of moisture from trapping beneath pipe (P) which would otherwise cause wear and corrosion of pipe (P). Fluid runs onto and down the sides of pipe (P), over and down the rounded surfaces (39) of the support blocks (35) into valleys (37) between the rides (36), and down the sloped base (14) into channel (38) at the bottom of the base (14), and off the end of channel (38) onto the support member (12) or grade.

FIG. 8 is a top view of the pipe support structure (30) showing orientation of the support ridges (36). The ridges (36) may be arrange at any desired angle (α) with respect to the horizontal centerline (CL) of the base (14) in order to create a suitable valley (37) with sufficient space for drainage and provide adequate support on the peripheral underside of the pipe (P). An angle (α) in the range of 25° to 35° such as 30° is thought to be sufficient though angles of lesser or greater degrees may also be implemented to achieve desired drainage.

Pipe support structures (10), (20), and (30) may be constructed from any suitable material including non-corrosive metals or metal alloys, such as but limited to those of aluminum, steel, and titanium, or these structures may be constructed of plastic or polymer materials. Preferably the pipe support structures (10), (20), and (30) will be molded from non corrosive thermoplastic polymer materials and composites. Thermoplastic polymer materials and composites suitable for molding the pipe support structure include polyethylene (PE) and polyethylene composites including high-density polyethylene (HDPE), ultra-high molecular weight PE (UHMWPE), and medium-density PE (MDPE), or a combination of such materials, and including those materials with reinforcing fibers.

The pipe support structures (10), (20), and (30) may also be cast or machined from metal or metal alloys such as stainless steel, titanium, titanium alloys, aluminum or aluminum alloys. The support structures (10), (20), and (30) may be made metal or metal alloys that are inherently non-corrosive. Pipe structures (10), (20), and (30) constructed of metal or metal alloys may be provided with a non-corrosive coating such as a polymer coating to further impede corrosion of the support during use. In harsh environments non-corrosive metals or metal alloys may be more suitable due to their advantages of structural strength and non-corrosive characteristics.

When molded or cast pipe support structures (10), (20), and (30) may be formed in convenient lengths or strips and cut in the field in segments of a desired length to match a particular support situation. This will allow a user to customize a pipe support in the field as desired. A single segment of a pipe support structure (10), (20), or (30) may be fitted under the pipe (P) or multiple segments of a pipe support structure (10), (20), or (30) may be used depending upon the pipe (P) to be supported and the characteristics of the underlying support (12) where the pipe support structures (10), (20), or (30) are used.

The installation method includes locating a pipe (P) positioned upon a support surface (12) and providing a pipe support structure (10), (20), or (30). The pipe (P) is then lifted off the support and a pipe support structure (10), (20), or (30) is mounted on the support surface (12). The pipe (P) is then placed upon the so that the curved surfaces of ridges (16, 26, or 36) support pipe (P) on its peripheral underside and not from directly underneath pipe (P).

When replacing an existing pipe support with a pipe support structure (10), (20), or (30), the pipe (P) is lifted from the existing pipe support, the existing pipe structure is removed from the support surface (12) and replaced with a desired pipe support structure (10, 20, or 30). After removing an existing pipe support, it may be necessary to clean the pipe (P), the pipe support surface (12) of any adherent fluid, rust, or deleterious materials which would enhance corrosion or affect the drainage of fluid from the replacement pipe support structure (10, 20, or 30). Further, during replacement of an existing pipe support, it may be necessary to replace any damaged corrosion protection coatings that may be placed around the pipe (P). No welding, adhesives, or other costly installation techniques are typically required.

Though this specification is directed toward using the pipe support structures (10, 20, or 30) to support a length of pipe, the term "pipe," it is not intended to restrict the use of a pipe support structure (10, 20, or 30) to a single purpose. The pipe support structures (10, 20, or 30) may be used to support and direct fluid flow away from a variety of structures requiring support and protection including, tubular vessels and not just lengths or segments of pipe. In particular, it is envisioned that the pipe support structures (10, 20, or 30) may be used to support instrumentation tubing, conduit for electrical power line, conduit for process instrumentation and sensing, pressure vessels, tanks, and the like such as may be used in power generation, chemical and petrochemical facilities, transportation facilities, oil and gas platforms, agricultural facilities, wastewater treatment facilities, and manufacturing facilities without limitation.

It is thought that the pipe support structures (10, 20, or 30) and the methods of the present invention and their attendant advantages will be understood from the foregoing description. It is also thought that one may make various changes in the form, construction and arrangement of the parts of the pipe support structures (10, 20, or 30) and methods described without sacrificing their material advantages or departing from the spirit and scope of the invention.

I claim:

1. A pipe support structure comprising:
   a, a base provided with predetermined break points;
   b, a plurality of blocks mounted on said base; said blocks having a curved surface and arrayed wherein said curved surface creates raised ridges and intervening valleys upon said base;
   c, a drainage channel traversing said base, said channel being in fluid communication with said valleys; and
   d. said blocks and said base configured whereby said ridges are oriented to support a pipe longitudinally on its peripheral underside with a space between said pipe and said base, wherein said ridges are arranged, at an angle with respect to the centerline of said base to direct fluid to said drainage channel.

2. The pipe support structure recited in claim 1 wherein said blocks have a carved surface abutting said pipe.

3. The pipe support structure recited in claim 2 wherein said base and said blocks are comprised of polymer materials.

4. The pipe support structure recited in claim 2 wherein said base and said blocks are comprised of metals.

5. The pipe support structure recited in claim 2 wherein said ridges and said intervening valleys created by said blocks create a wave shaped profile.

6. The pipe support structure recited in claim 2 wherein said blocks are rectangularly shaped.

7. The pipe support structure recited in claim 2 wherein said blocks are ovate in shape.

8. A method of installing a pipe support apparatus comprising the steps of:
   a. providing a pipe support structure comprising:
      i a base having a central' longitudinally extending drainage channel, said base is tapered downward towards said drainage channel;
      ii. a plurality of blocks mounted on said base on either side of said drainage channel, said blocks having a curved outer surface, said blocks arrayed longitudinally along said drainage channels to create a plurality of raised ridges with intervening valleys in fluid communication with said drainage channel; and iii, wherein said ridges are arranged and oriented to support a length of pipe longitudinally on its peripheral underside with a space between the bottom of said pipe and said base;

b, placing said base of said pipe support structure on a support surface; and c. placing said length of pipe on said pipe support structure, wherein the peripheral underside of said section of pipe is supported on said curved outer surface of said blocks.

9. The method of installing a pipe support apparatus of claim 8, further comprising the steps of:

a. identifying said section of pipe supported on a preexisting pipe support mounted on said support surface;

b. lifting said section of pipe from said preexisting pipe support;

c. removing said preexisting pipe support from said support surface; and c. cleaning said pipe and said support surface.

10. The method of installing a pipe support apparatus recited in claim 9, further comprising the step of breaking said pipe support structure to create a pipe support structure of a desired length.

11. The method of installing a pipe support apparatus recited in claim 10, further comprising the step of replacing damaged corrosion protection coatings on said pipe.

12. The method of installing a pipe support apparatus recited in claim 10, further comprising the steps of:

a. providing predetermined break points in said pipe support structure; and b. breaking said pipe support structure on said predetermined break points.

* * * * *